United States Patent
Zhang et al.

(10) Patent No.: US 8,644,532 B2
(45) Date of Patent: Feb. 4, 2014

(54) CHANNEL COORDINATION BETWEEN A WIRELESS EARPHONE AND A TRANSMITTER

(75) Inventors: Yifeng Zhang, San Jose, CA (US); Kou-Hu Tzou, San Jose, CA (US); Pengyi Hong, Beijing (CN); Hangwei Guo, Beijing (CN)

(73) Assignee: Quintic Holdings, George Town, Grand Cayman (KY)

( * ) Notice: Subject to any disclaimer, the term of this patent is extended or adjusted under 35 U.S.C. 154(b) by 1300 days.

(21) Appl. No.: 12/172,147

(22) Filed: Jul. 11, 2008

(65) Prior Publication Data

US 2009/0310803 A1 Dec. 17, 2009

Related U.S. Application Data

(63) Continuation-in-part of application No. 12/137,535, filed on Jun. 11, 2008.

(51) Int. Cl.
*H04R 5/02* (2006.01)

(52) U.S. Cl.
USPC .................................. 381/311; 455/150.1

(58) Field of Classification Search
USPC .......................... 381/1–7, 311, 10, 56, 77, 79;
455/239.1–250.1, 236.1, 456.1, 456.4,
455/456.6, 502, 62, 450, 452.1, 150.1;
700/94; 713/176, 189, 320; 709/247;
726/32
See application file for complete search history.

(56) References Cited

U.S. PATENT DOCUMENTS

| | | | |
|---|---|---|---|
| 5,881,365 A | * | 3/1999 | Yang et al. ..................... 455/45 |
| 7,817,960 B2 | * | 10/2010 | Tan et al. ..................... 455/11.1 |
| 2006/0126861 A1 | * | 6/2006 | Saliterman ..................... 381/77 |

* cited by examiner

*Primary Examiner* — Lun-See Lao
(74) *Attorney, Agent, or Firm* — Maryam Imam; IPxLaw Group LLP

(57) ABSTRACT

A method of the present invention includes coordinating tuning to the same channel of a radio band wherein the following steps are performed: tuning to a channel, within a radio band, that uses a side band; receiving control information in the side band of the channel; and processing the received audio information in the channel using the control information.

7 Claims, 6 Drawing Sheets

CHANNEL COORDINATION BETWEEN A WIRELESS EARPHONE AND A TRANSMITTER

CROSS REFERENCE TO RELATED APPLICATIONS

This application is a continuation-in-part of U.S. patent application Ser. No. 12/137,535, entitled "Frequency Modulation (FM) Clear Channel Scanning System And Method of Using Same", filed on Jun. 11, 2008; which is incorporated herein by reference as though set forth in full.

BACKGROUND OF THE INVENTION

1. Technical Field of the Invention

The present invention relates generally to a wireless earphone system and more particularly to wireless earphone devices that automatically tune to an available channel within a radio band.

2. Description of the Prior Art

Low-power frequency modulation (FM) transmission in the FM broadcast channels is a permissible application in many countries for personal use as long as the transmitted power is in compliance with local regulatory standards. Wireless earphones are one such application based on FM broadcast channel. When a user wears a wireless earphone and travels around, the channel selected by the user may become actively used by others and causes interference.

Using current channel selection methods. The user needs to change a channel to one that is available by first finding a channel that is not in use and then changing the transmitter of a transmitter/receiver system to the channel found and then changing the channel of the receiver, which is typically located in the wireless earphone device. This results in deterring use of wireless earphone devices.

What is needed is a device and method for automatically coordinating between a transmitter and a receiver associated with wireless earphones.

SUMMARY OF THE INVENTION

Briefly, in an embodiment of the present invention, a wireless earphone system is disclosed to include a frequency modulation transmitter (FMT) block for transmitting to a wireless earphone device. The wireless earphone device includes a FM receiver (FMR) with radio data system (RDS or RDBS) and audio decryption and the FMT block includes (or is) FM transmitter (FMT) with RDS and audio encryption capability. Alternatively, the wireless earphone device and the FMT block are each FM transceivers having the capability of receiving and transmitting signals. In either embodiment, the wireless earphone device automatically tunes to a vacant channel found by the FMT (or FMX) block without human intervention and in real-time thereby allowing the process of tuning and receiving audio signals through the wireless earphone device transparent to the user of the wireless earphone device.

A method of the present invention includes coordinating tuning to the same channel of a radio band wherein the following steps are performed: tuning to a channel, within a radio band, that uses a side band; receiving control information in the side band of the channel; and processing the received audio information in the channel using the control information.

The foregoing and other objects, features and advantages of the present invention will be apparent from the following detailed description of the preferred embodiments which make reference to several figures of the drawing.

DETAILED DESCRIPTION OF THE INVENTION

To overcome the limitations in the prior art described above, and to overcome other limitations that will become apparent upon reading and understanding the present specification, an embodiment of the present invention discloses a wireless earphone system to include a frequency modulation transmitter (FMT) block for transmitting to a wireless earphone device. The wireless earphone device includes a FM receiver (FMR) with radio data system (RDS or RDBS) and audio decryption and the FMT block includes (or is) FM transmitter (FMT) with RDS and audio encryption capability. Alternatively, the wireless earphone device and the FMT block are each FM transceivers having the capability of receiving and transmitting signals. In either embodiment, the wireless earphone device automatically tunes to a vacant channel found by the FMT (or FMX) block without human intervention and in real-time thereby allowing the process of tuning and receiving audio signals through the wireless earphone device transparent to the user of the wireless earphone device.

A method of the present invention discloses coordinating tuning to the same channel of a radio band wherein the following steps are performed: tuning to a channel, within a radio band, that uses a side band; receiving control information in the side band of the channel; and processing the received audio information in the channel using the control information.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of embodiments of the present invention.

Figure 1:
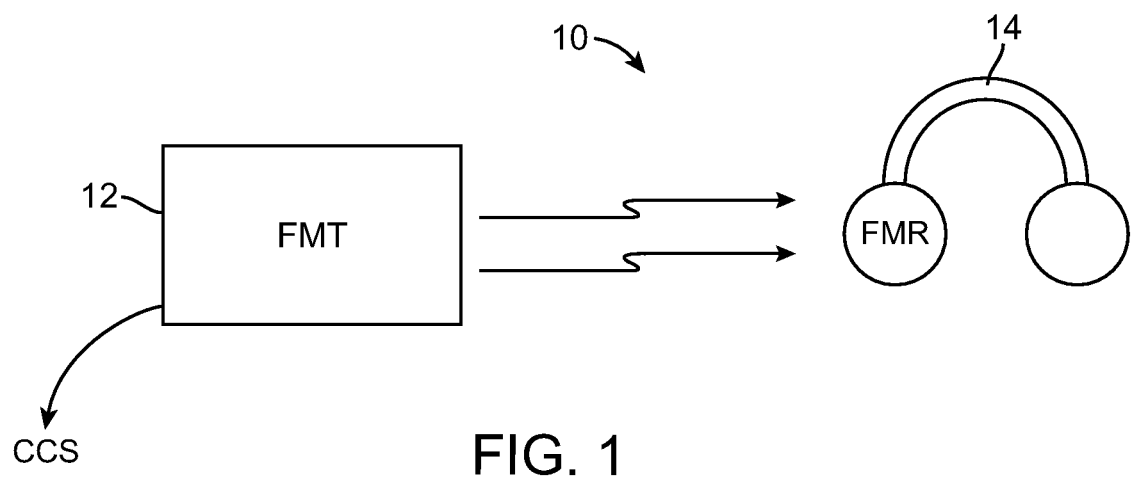
FIG. 1 shows a wireless earphone system, in accordance with an embodiment of the present invention.

FIG. 1 shows a wireless earphone system 10 to include a frequency modulation transmitter (FMT)) block 12 shown transmitting to a wireless earphone device 14, in accordance with an embodiment and method of the present invention. The device 14 includes a FM receiver (FMR) with radio data system (RDS or RDBS) and audio decryption and the block 12 includes (or is) FM transmitter (FMT) with RDS and audio encryption capability. RDS is generally a communications protocol standard for sending small amounts of digital information using conventional FM radio broadcasts. The RDS system standardizes several types of information transmitted, including time, track/artist information and station identification. RDS may be used to pass audio encryption keys between two devices. An encryption key is an identification or value that remains unknown to the outside world and only known to the transmitter and receiver and used to decipher the information being exchanged. RDS uses sideband digital data. That is the sidebands (in a frequency plot) of the channel where signal strength of the main band is substantially smaller are used for transmission. Rather than RDS, other radio data systems such as Data Radio Channel (DARC) and Subsidiary Communications Authority (SCA) may be used for transmission/reception of radio band audio information. Use of sideband digital signals effectively reduces or avoids interference from other channels.

The earphone device 14 is portable and wireless. The FMT block 12 may be any portable wireless receiver device, such as and not limited to a portable digital video recorder (DVR), an MP3 player, an MP4 player or any other type of portable media player, and the like. The block 12 functions as a transmitter and thereby sends signals to the device 14 informing the latter of the channel to be tuned for reception of data. However, prior to so doing, the block 12 may scan to find an available channel by performing a clear channel scan (CCS) if it is not already tuned to an available channel for transmission. That is, the block 12 and the device 14 desirably tune to a vacant FM channel and to do so, such a channel must be found by scanning for the same, which is performed by the block 12. Alternatively, scanning and locating a vacant channel may be performed by the device 14.

In an exemplary approach, clear channel scanning is performed by taking into account the figure of merit (FOM) of side channels of a channel that is determined to be vacant, thereby increasing the reliability and performance of the scan. Examples of such techniques are disclosed in U.S. patent application Ser. No. 12/137,535; entitled "Frequency Modulation (FM) Clear Channel Scanning System And Method of Using Same", filed on Jun. 11, 2008; which is incorporated herein by reference as though set forth in full.

Where the FM band is desirously used for transmission, the FM band (or a sub-band thereof) is scanned and where other radio bands are desired, other bands are scanned. It is noted however, that due to the lower frequency range associated with FM, the system 10 is advantageously lower in power than a Bluetooth-based system. Bluetooth generally operates in the 2.4 Giga Hertz (GHz) range calling for approximately 30 milli-amps (mA) of current where FM generally operates in the 100 Mega Hz range calling for approximately 16 mA of current thereby rendering the FM-based system 10 advantageously in terms of power consumption.

Figure 2:
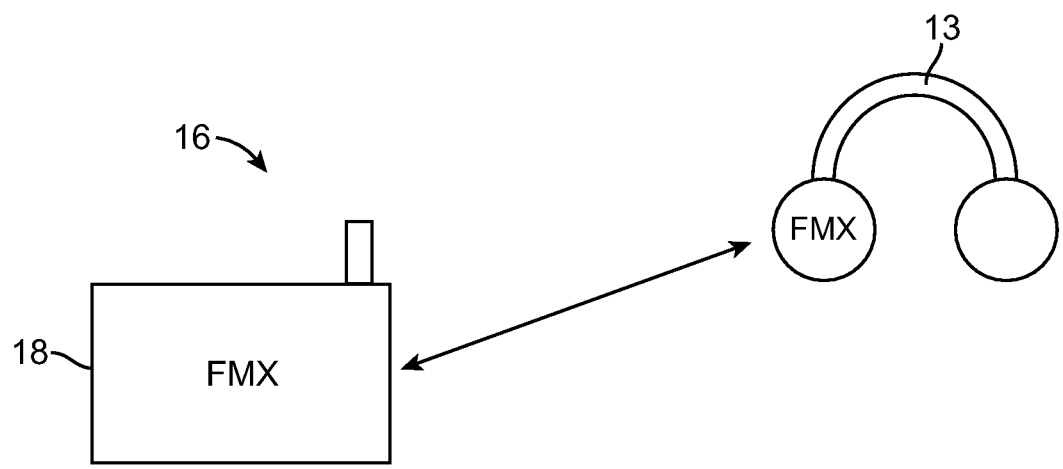
FIG. 2 shows an alternative wireless earphone system.

FIG. 2 shows a wireless earphone system 16, in accordance with another embodiment of the present invention. The system 16 is shown to include a frequency modulator transceiver (FMX) block 18 in communication with a wireless earphone device 13, which also includes a FMX. The FMX of the device 13 uses RDS and audio encryption/decryption capability and the FMX of the block 18 similarly uses RDS and audio encryption/decryption capability and/or identification capability. The FMX of the device 13 and the block 18 respectively allow each to act as a transmitter and a receiver whereas the device 14 of the system 10 only has reception capabilities and the block 12 of the system 10 only has transmission capabilities. The block 18 scans the FM (or other) band to find a vacant or available channel to be used for transmission.

Figure 3:
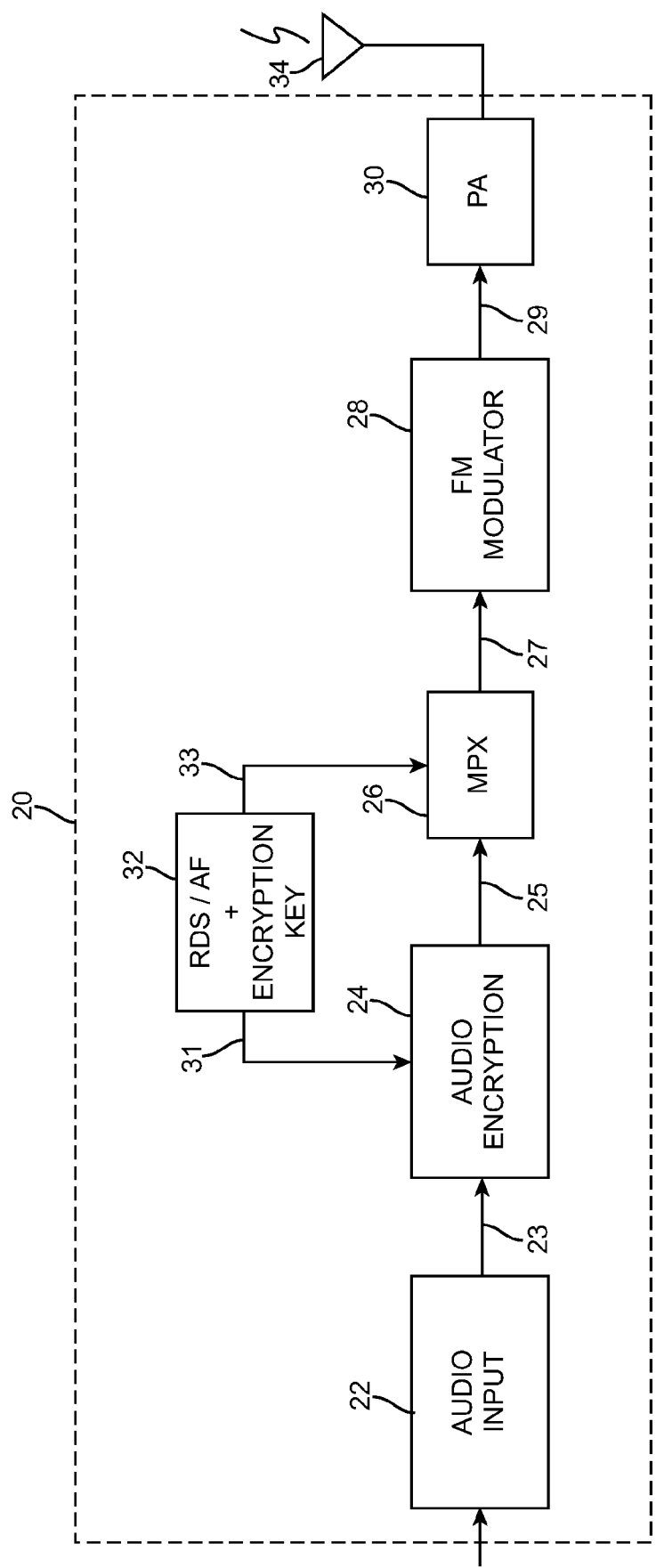
FIG. 3 shows a block diagram of a FM transmitter included in the wireless earphone system.

FIG. 3 shows a block diagram of a FM transmitter (FMT) block 20, which is the block 12 (or incorporated into the MP3 12) of FIG. 1, in accordance with an embodiment of the present invention. The block 20 is shown to include an audio input block 22, an audio encryption block 24, a multiplexer block 26, an FM modulator block 28 and a power amplifier (PA) block 30, and a RDS/alternate frequency (AF) and encryption key block 32. The audio input 22 is shown to receive audio information and is shown coupled to provide audio output 23 to the audio encryption block 24. The block 24 is shown to receive an encryption key output 31 from the block 32 and to provide an audio encryption output 25 to the block 26. The block 26 is shown to provide a multiplexer output 27 to the block 28, which provides a modulator output 29 to the block 30. The block 30 is shown coupled to the antenna 34, which transmits information regarding the channel to be tuned to the device 14 of FIG. 1. The block 32 is shown to provide an RDS output 33 to the block 26.

The block 22 is responsive to audio input and passes the same to the block 24, which optionally encrypts the received audio information with an encryption key. This option advantageously allows the user of the device 14 to listen to an FM channel without any concerns for security of the information. That is, an undesirable intruder will not have the option of listening into the same channel as that which is being listened to by the user of the device 14. The block 24 performs encryption using known encryption techniques, such as but not limited to subband scrambling where the audio input is converted into subband signals, the subbands are shuffled under the control of the Encryption key, and subband signals are then converted back to time-domain audio signal. Since the characteristics of the audio signal is substantially altered by this encryption process, the encrypted audio is not legible any more. The encryption key is provided by the block 32 onto the output 31 to the block 24. After encrypting the audio input, the block 24 provides the encrypted audio output 25 to the block 26, which combines the RDS/Alternative Frequency (AF) plus the encryption key using a subcarrier with the encrypted audio. The multiplexed signal is then passed through the conventional FM modulator of block 28 and amplified by block 30 for transmission through Antenna 34.

Alternatively, rather than an encryption key, an identification (ID) is used and compared to an ID within the received audio information and if there is a match, the block 20 outputs the received audio channel, through the antenna 34, and remains tuned to the same channel. Otherwise, in the event of a mismatch or there is no ID detected, the block 20 outputs the received audio channel, through the antenna, and tunes to another channel.

The encryption key and ID are each a form of control information embedded within the audio information received by the block 22. It is contemplated that the control information may take on other forms. The control information is generally received in the side band of the channel that is tuned thereto and it is used to process the received audio information. In one embodiment, where the control information is an ID, the ID is used to compare against an expected ID and if the result is positive, i.e. there is a match, the block 20 outputs the received audio information (or channel) and remains tuned to the same channel. When there is no match, the block 20 does not output the received audio information and tunes to another channel.

The block 28 receives the output 27 and modulates the same using a selected FM carrier, in the case the FM band is being used and then provides the output 29 to the block 30, which amplifies the output 29 prior to transmission of the same to the antenna 34.

Figure 4:
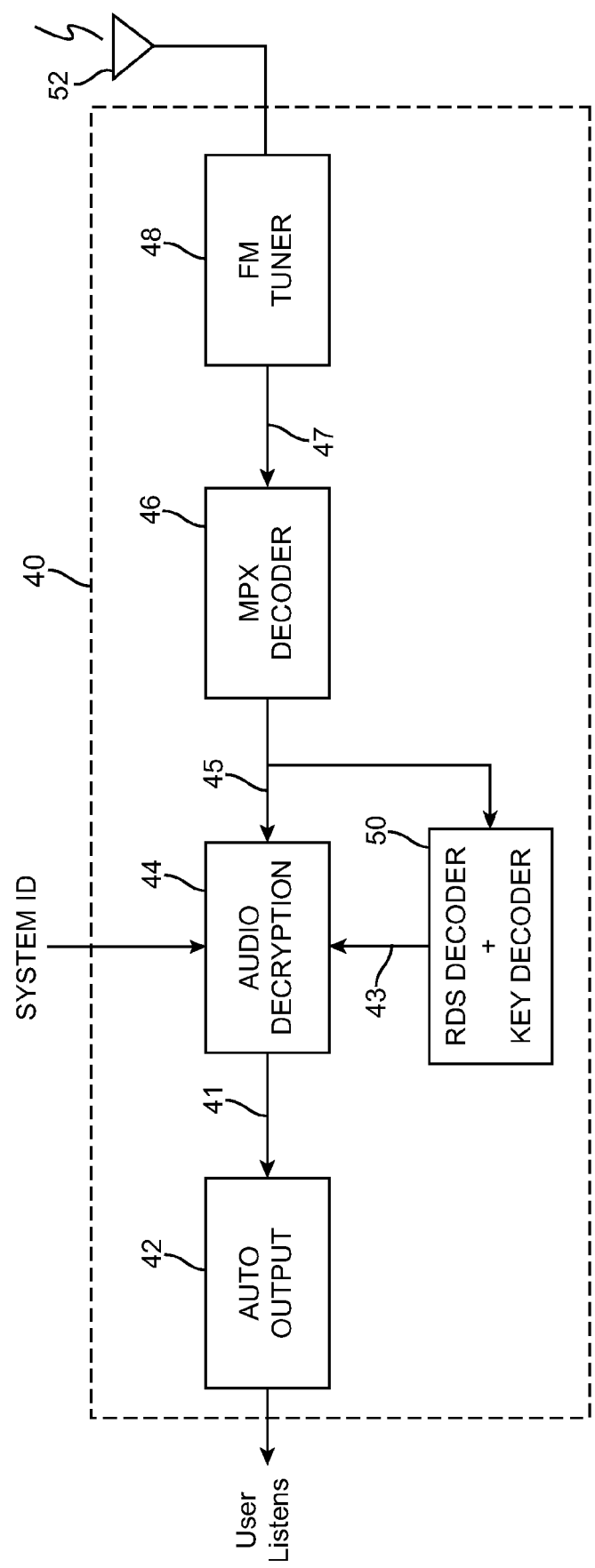
FIG. 4 shows a FMR block included in the wireless earphone system.

FIG. 4 shows a FMR block 40 coupled to an antenna 52, which receives information regarding the channel to be tuned to from the antenna 34. The FMR block 40 is shown to include an FM tuner block 48, a multiplexer decoder block 46, an audio decryption block 44, a RDS decoder (or decryption) and key decoder block 50 and an audio output block 42.

The information received by the antenna 52 is passed onto the FM tuner block 48, which tunes to a channel having a side band and based thereon generates the tuner output 47. The output 47 is received by the block 46 and demodulated (or decoded) by the block 46, which provides the decoder output 45 to the block 44 and the block 50. The block 44 receives the output 45 and uses the same to decrypt the audio signal optionally using the decryption (or decoder) key from the block 50, the key having been provided to the block 44 through the RDS decoder and key output 43. That is, for example, in the case where a key is used, the key is provided to the block 44 and in the case where an ID is used, the ID is provided to the block 44. The decrypted audio output 41 is generated by the block 44 after decrypting the audio signal and the output 41 is passed onto the block 42, which in turn, passes the audibly decipherable and intrusion-free audio signal to the user of the 14 or 13. The block 44 decrypts using the key or compares the ID (in the case where an ID is utilized) and depending on the outcome, either the channel that is tuned to remains tuned or another channel is tuned. In the case where an ID is used, the received ID is compared to an expected or predetermined ID and if there is a match, the same channel that is tuned to remains tuned, otherwise, the receiver or block 40 tunes to another channel.

Alternatively, rather than a decryption key, another form of control information, such as an ID is used where the ID is checked against an expected ID for verification of the vacant channel.

The FMR block 40 is generally located with the device 14 or the device 14 and it automatically tunes to an FM channel selected by the block 12 of FIG. 1 or the FMX block 18 of FIG. 2. Automatically, as used herein, refers to lack of human intervention and in real-time. This advantageously, allows the user of the wireless earphone device to tend to other matters and to more easily use the earphone in collaboration with the multi-media player. Use of the encryption/decryption key prevents unauthorized people from listening in or even tuning to the channel that is being used by the user of the earphone device. As previously discussed, any form of control information, such as but not limited to an ID may be used in place of an encryption/decryption key.

The block 40 may optionally be instructed to switch to another channel, e.g. alternative frequency (AF), than that to which it is currently tuned by the block 20. The block 32, in particular, instructs tuning to AF and the block 26 then selects the output 33, rather than the output 25, to transmit to the block 28. Alternative frequency assists in tuning and reduces tuning time by reducing the number of vacant channels that must be scanned by the receiver. Yet another option is using a subset of vacant channels to reduce tuning time.

In summary, the block 40 coordinates tuning to the same channel of a radio band as that of a corresponding transmitter by tuning to a channel, within a radio band, that uses a side band. In so doing, the block 40 receives control information in the side band of the channel, and processes the received audio information in the channel using the control information.

Figure 5:
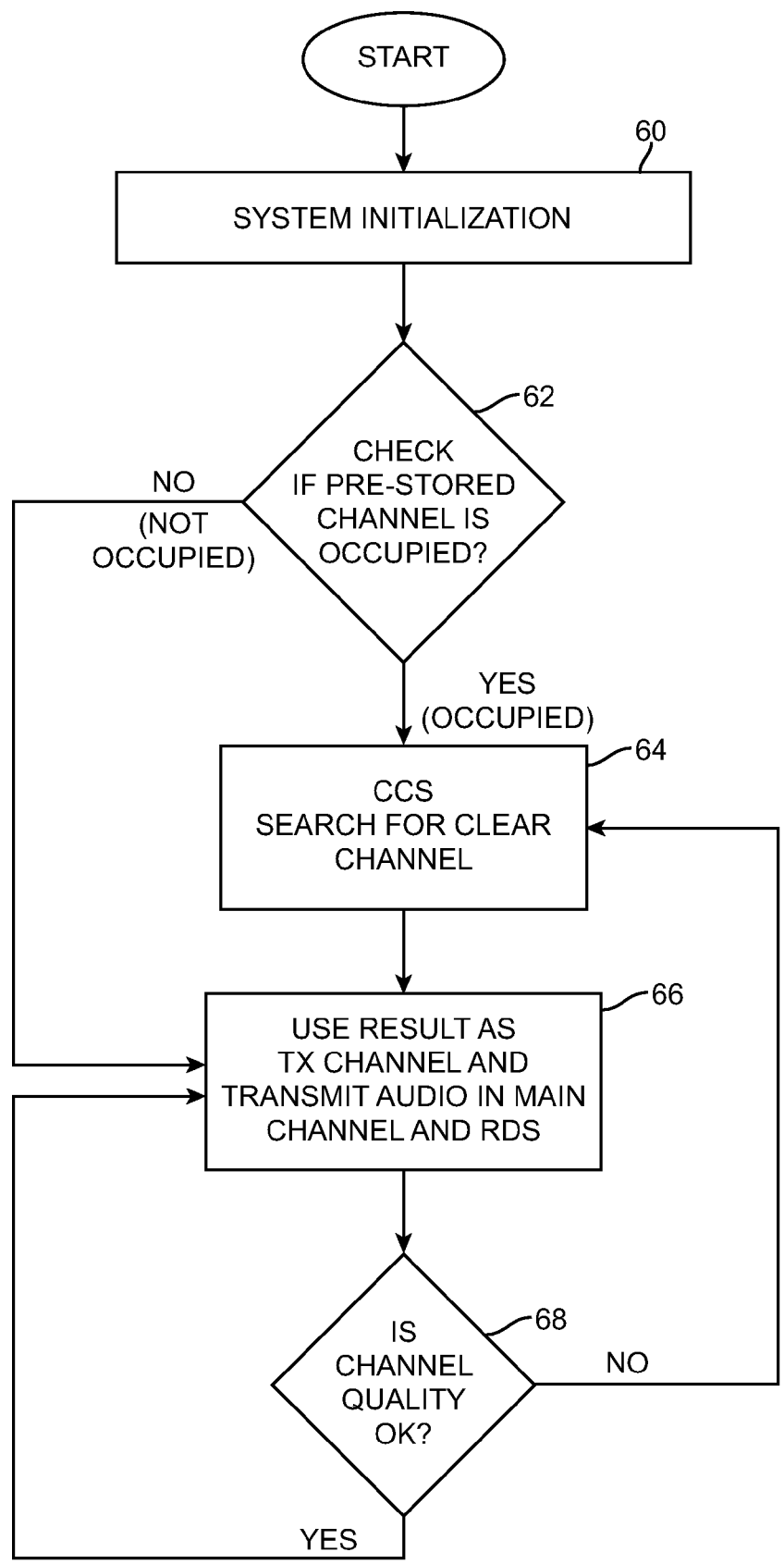
FIG. 5 shows a flow chart of the relevant steps performed by the FMT block, in accordance with a method of the present invention.

FIG. 5 shows a flow chart of the relevant steps performed by the FMT block 20 of FIG. 2, in accordance with a method of the present invention. At the outset, the system or the block 20 is initialized at step 60, as is the FMR block 40. In fact, the blocks 20 and 40 synchronize with each other at the outset and then the block 20 finds a channel and the two again then synchronize before the block 20 transmits on the channel to be tuned to.

Next, at 62, a determination is made as to whether or not the channel that has already been identified (and stored) is occupied and if so, the process continues to step 64, otherwise, the process continues to step 66. At step 66, a search for an available channel is conducted and a result obtained identifying a vacant channel. Next at step 66, the result of step 64 is used as the channel for transmission of audio (information) in the main channel along with RDS in the subcarrier that is carrying the control information. In the FM broadcast system, RDS has been used to carry various kinds of information service. An example of the RDS subcarrier is an Alternative Frequency (AF) which can be used to coordinate frequency switching to ensure suitable signal quality can always be received in a mobile environment. Control information may be an encryption key, or other system identification. Next, at 68, the channel quality is checked and if it is determined to be acceptable, the process remains unchanged and continues to step 66, otherwise, the process continues to step 64. Channel quality can be assessed by measuring the signal to noise (SNR) of the channel at the transmitter side using a receiving circuit while momentarily turning off the RF signal. Other channel quality measuring methods can also be used to achieve the same purpose. Channel quality can also be easily provided by the user wearing the wireless earphone. For example, if the listener considers the channel to be noisy, the listener can trigger an indication thereof, by for example, pushing a button at the transmitter side to indicate an in-satisfactory channel quality.

The control information can be simply a system identification (ID) for the receiver to identify. If the system ID matches the ID stored at the receiver the receiver may consider it is an intended channel and start to output the audio signal to the earphone device or other output devices. For more privacy protection, the system may employ audio encryption as described hereinabove. In this case, an encryption key is transmitted along with the system ID. When the system ID matches the ID stored at the receiver, the receiver uses the encryption key to decrypt the audio and output the decrypted audio.

Figure 6:
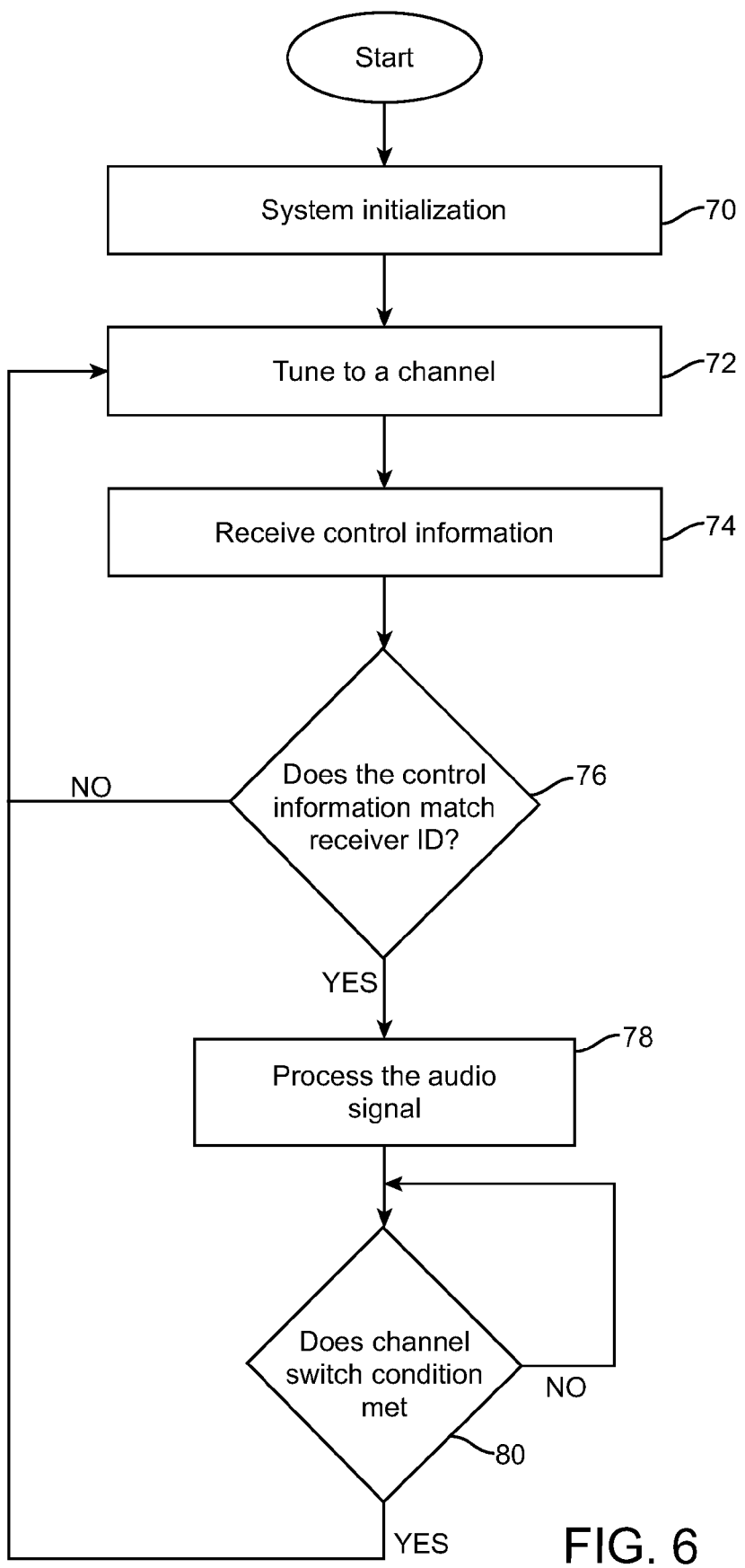
FIG. 6 shows a flow chart of the relevant steps performed by the FMR block, in accordance with a method of the present invention.

FIG. 6 shows a flow chart of the relevant steps performed by the FMR block 40, in accordance with a method of the present invention. At step 70, the block 40 is initialized, as previously noted. Next at step 72, the receiver is tuned to a channel in the radio band. At step 74, the receiver receives the control information from the subcarrier channel. If the tuned channel does not include a subcarrier, the received control information is considered NULL.

The receiver then processes the received audio signal according to the received control information. The receiver checks the system ID to determine whether it matches the system ID that is stored at the receiver. If the two match, the channel that is tuned to is an intended channel and the receiver outputs the audio signal. If an audio encryption is used, the receiver uses the encryption key to descramble the audio signal.

Figure 7:
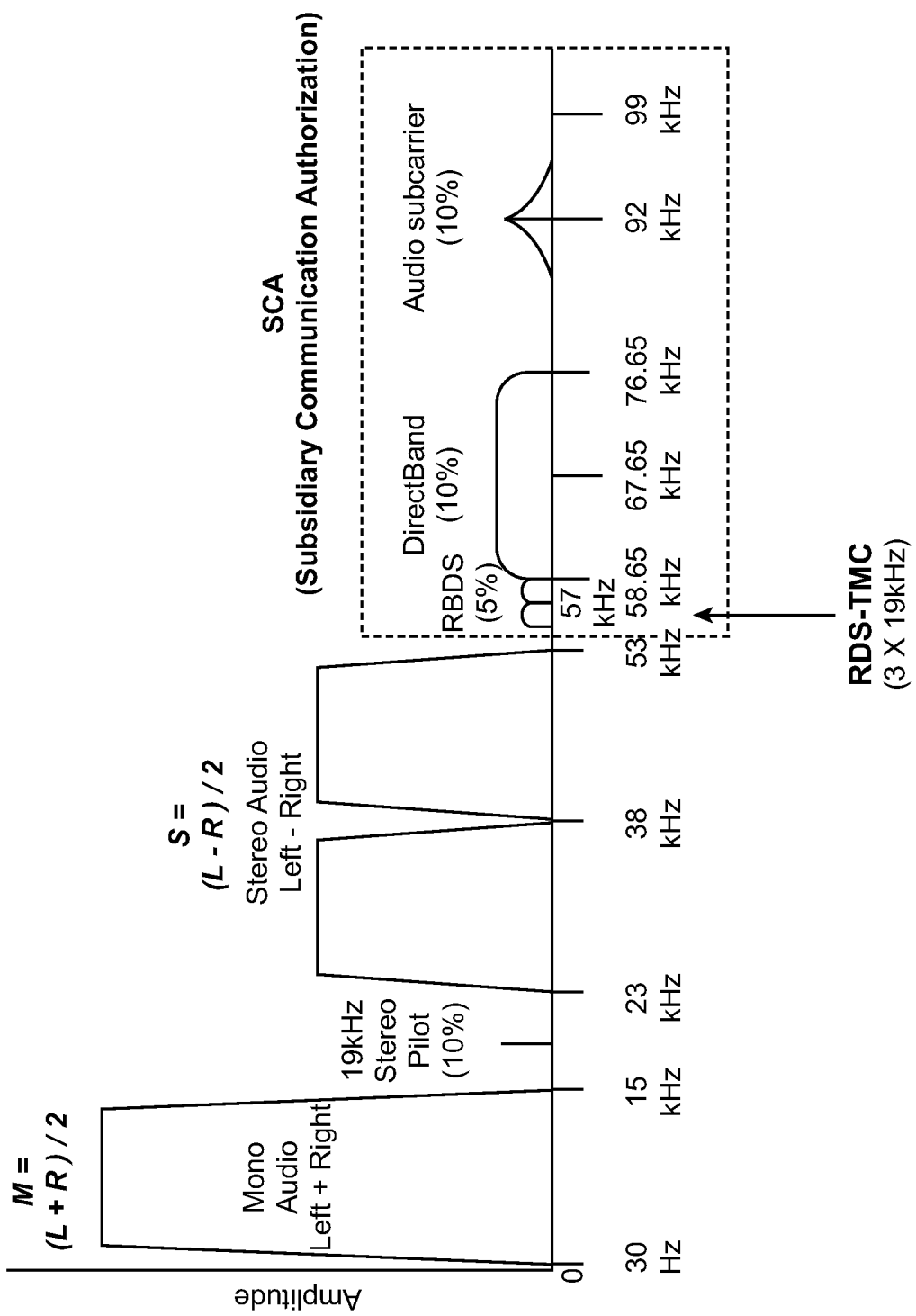
FIG. 7 shows graph of amplitude versus frequency showing RDS channels.

The subcarrier used in the FM broadcast system is often located at a frequency band that is higher than the bandwidth carrying the multiplexed audio signal. FIG. 7 shows graph of amplitude versus frequency showing RDS channels. The y-axis represents amplitude and the x-axis represents frequency in kilo Hz (kHz). The RDS channels are shown to be generally in the 57 kHz range.

Although the present invention has been described in terms of specific embodiments it is anticipated that alterations and modifications thereof will no doubt become apparent to those skilled in the art. It is therefore intended that the following claims be interpreted as covering all such alterations and modification as fall within the true spirit and scope of the invention.

What is claimed is:

1. A method of coordinating tuning to the same channel of a radio band comprising: first synchronizing a FM transmitter (FMT) block to a second FM receiver (FMR) block that receives audio information regarding a channel to be tuned to; finding a channel to be tuned to; second synchronizing again the FMT block to the second FMR block; tuning to the found channel, within a radio band, that uses a side band; receiving control information in the side band of the channel; and processing the received audio information in the channel using the control information, wherein the audio information is transmitted onto the channel after the second synchronization step is performed.

2. A method of coordinating tuning, as recited in claim 1, wherein during processing, outputting the received radio information.

3. A method of coordinating tuning, as recited in claim 1, wherein the processing is performed using an identification (ID), within the received audio information, as the control information.

4. A method of coordinating tuning, as recited in claim 3, wherein comparing the ID to a predetermined ID and only if there is a match between the ID and the predetermined ID match, outputting the received audio information.

5. A method of coordinating tuning, as recited in claim 1, wherein during processing, encrypting the received audio information using an encryption key as the control information.

6. A method of coordinating tuning, as recited in claim 1, wherein the tuning step causes tuning to an alternative frequency.

7. A method of coordinating tuning, as recited in claim 1, wherein during the processing step, determining whether or not the channel is occupied and if so, searching for a clear channel.

* * * * *